(No Model.) 2 Sheets—Sheet 1.
J. STOCKER & H. H. PHILPER.
LIQUID COOLING APPARATUS.
No. 594,440. Patented Nov. 30, 1897.
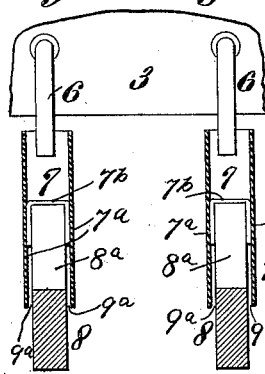
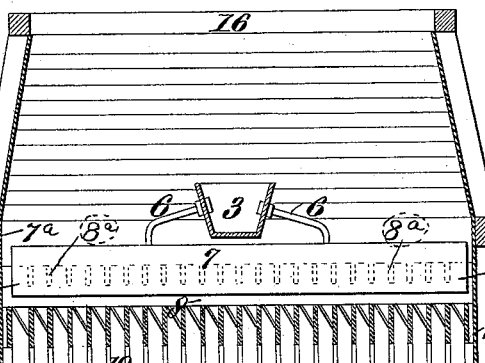
Attest:
E. S. Knight
J. Stover
Inventors
John Stocker
Harry H. Philper,
By Wright Bro
att'ys (No Model.) 2 Sheets—Sheet 2.
J. STOCKER & H. H. PHILPER.
LIQUID COOLING APPARATUS.
No. 594,440. Patented Nov. 30, 1897.
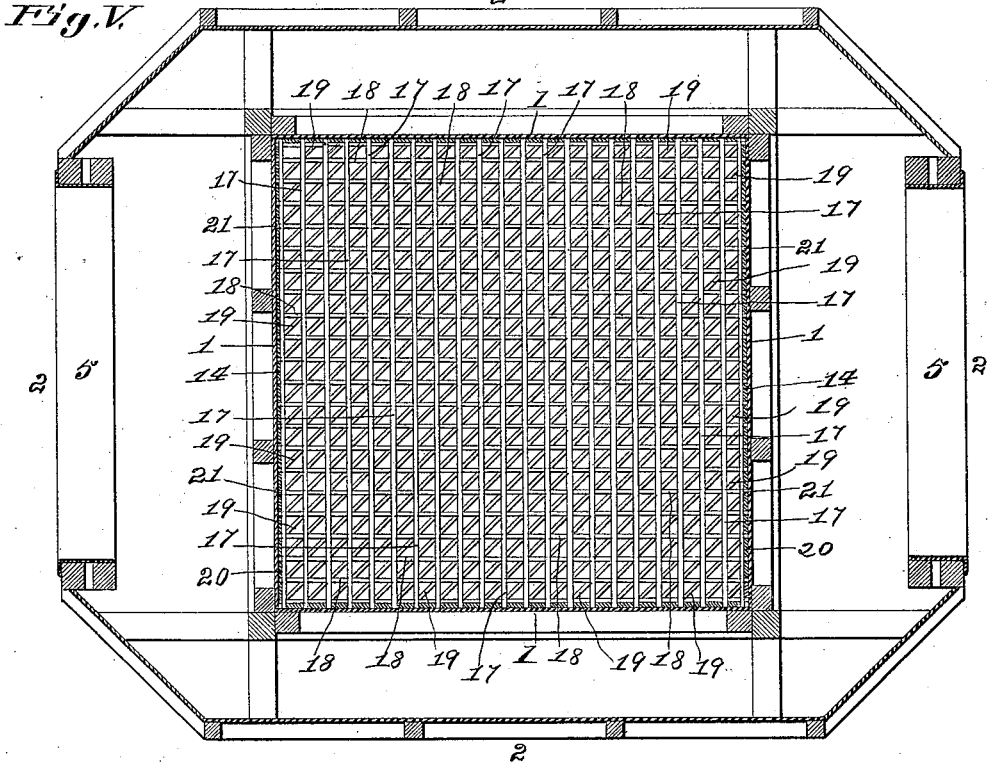
Fig. V.
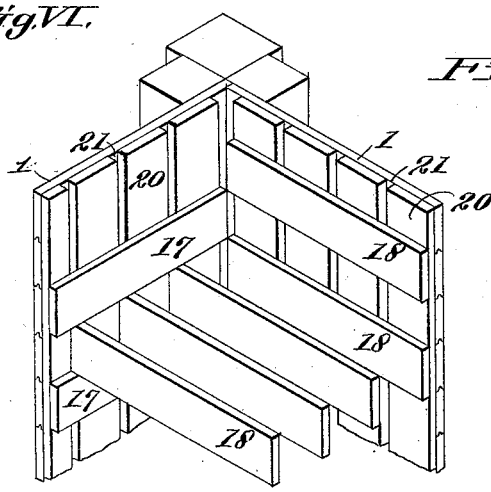
Fig. VI.
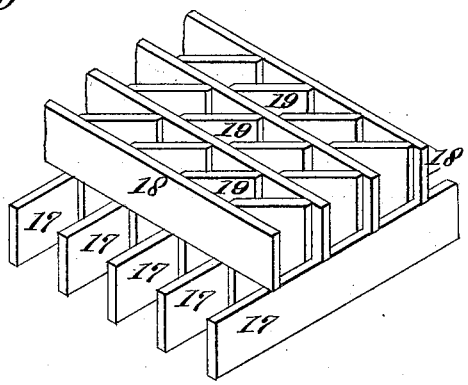
Fig. VII.
Fig. VIII.
Attest:
E. S. Knight
J. Stone
Inventors,
John Stocker
Harry H. Philper
By Wright Bro attys
THE NORRIS PETERS CO., PHOTO-LITHO., WASHINGTON, D. C.

UNITED STATES PATENT OFFICE.

JOHN STOCKER AND HARRY H. PHILPER, OF ST. LOUIS, MISSOURI.

LIQUID-COOLING APPARATUS.

SPECIFICATION forming part of Letters Patent No. 594,440, dated November 30, 1897.

Application filed November 13, 1896. Serial No. 612,039. (No model.)

*To all whom it may concern:*

Be it known that we, JOHN STOCKER and HARRY H. PHILPER, citizens of the United States, residing at the city of St. Louis, in the State of Missouri, have invented a certain new and useful Improvement in Liquid-Cooling Apparatus, of which the following is a full, clear, and exact description, reference being had to the accompanying drawings, forming a part of this specification.

The object of our invention is to provide an improved apparatus which is of easy and economical construction that will satisfactorily cool liquids by means of a current of air introduced under and through the heated liquid. It is adapted for use in breweries, artificial-ice plants, and the like where a large body of liquid is to be reduced in temperature.

Referring to the drawings, Figure I is a vertical cross-section of our improved liquid-cooling apparatus, showing the manner of introducing both the liquid and the air and the tower through which the liquid percolates. Fig. II is a vertical section thereof taken along the line II II of Fig. III, showing the manner of regulating the outlet from the trough into which the heated liquid is introduced. Fig. III is a side view of the said trough. Fig. IV is a detail side elevation showing the manner of building up the tower for breaking the flow of liquid as it passes therethrough. Fig. V is a horizontal cross-section taken on the line V V of Fig. I. Fig. VI is a detail perspective view of a corner, showing the manner of building the tower. Fig. VII is a detail perspective view showing the manner in which the interior of the tower is built up. Fig. VIII is a detail view looking down on one side of the corner shown in Fig. VI, the sides and upright pieces being sectioned.

1 represents the tight sides of the tower. 2 is the flaring or expanded base thereof.

3 is a trough extending across the tower, through which the heated liquid is passed, and 4 is a trough at the base of the apparatus for carrying off the cooled liquid.

5 are two revolving fans used to introduce an upward current of cool air at the base of the tower. 6 are tubes extending transversely from the trough 3 to lower troughs 7. These troughs 7 extend in series the entire width of the tower and practically fill all its upper space. They are each provided with depending sides $7^a$ and with a sectional bottom $7^b$, forming openings $7^c$, and the troughs can thus be moved back and forth over the beams 8, (having slots $8^a$,) so as to adjust them, thus regulating the width of the exits 9. It will thus be seen that by sliding the troughs 7 on the beams 8 a greater or less amount of flow can be secured downward from the tower proper.

The interior of this tower is built up in sections, of pieces of wood, tiling, or other proper material, set on edge, arranged in horizontal rows, as shown in Figs. I, IV, V, VI, and VII. The first or uppermost horizontal section 10 is the highest, and the horizontal rows gradually diminish in height downward through the succeeding sections 11, 12, 13, and 14. The lowest horizontal section 15 is preferably built with cross-pieces 17, increasing in number, so as to form a funnel-like or converging bottom, which leads to the exit-trough 4. The advantage of this arrangement is that as the heated water flows down through the tower its force is gradually broken, and the current of cool air coming in from the base and passing out through the top air-exit 16 is of greater efficacy in accomplishing the reduction of temperature desired.

Describing the interior of the tower specifically, it is made up of checker-work or cross-pieces in horizontal layers, graduated in height, consisting of boards, laths, tiles, or the like, 17 and 18, set at right angles to each other and which are between their intersections provided with upright oblique pieces 19. The casing sides 1 are provided with upright pieces 20, set equidistant apart on the inside thereof, leaving spaces 21, adapted to receive the ends of the cross-pieces 17 and 18. These cross-pieces 17 and 18, being at right angles to each other, afford easy means for the insertion of the oblique pieces 19. It will thus be readily seen that a maximum amount of exposed surface is obtained with a minimum amount of labor and expense in building the apparatus.

The two fans 5, as shown in the drawings, are attached to one shaft 22. It is, however, immaterial whether one or two or more fans are used for the introduction of the current of air. These fans are operated by any suitable power (not shown) applied to the said shaft 22.

Having thus described our invention, the following is what we claim as new therein and desire to secure by Letters Patent:

1. The combination in a tower, of a means for introducing a current of cool air at the base thereof, a means of introducing the liquid to be reduced in temperature at the top thereof, and a series of checker-work partitions on the interior of said tower, gradually diminishing in height toward the bottom of the tower, substantially as described.

2. The combination with a tower and means for introducing a current of air therethrough, of a slotted beam situated at the upper portion of said tower, and a sliding trough having a sectional bottom straddling the beam and provided with depending sides located out of contact with the beam; substantially as described.

3. A liquid-cooling device consisting of a tower, a means of introducing a current of air through said tower from the bottom thereof, a means of introducing the liquid from the top thereof, and a series of interior partitions composed of graduated slats placed horizontally at right angles with each other the height of the tower, and oblique vertical slats placed within the squares formed by said horizontal partitions, substantially as described.

JOHN STOCKER.
HARRY H. PHILPER.

In presence of—
E. S. KNIGHT,
STANLEY STONER.